United States Patent
Dyer

(10) Patent No.: US 7,497,261 B2
(45) Date of Patent: *Mar. 3, 2009

(54) METHOD FOR SIMULTANEOUS REMOVAL OF ASPHALTENE AND/OR PARAFFIN AND SCALE FROM PRODUCING OIL WELLS

(76) Inventor: Richard J. Dyer, 13305 Da Vinci Dr., Bakersfield, CA (US) 93314

( * ) Notice: Subject to any disclaimer, the term of this patent is extended or adjusted under 35 U.S.C. 154(b) by 0 days.

This patent is subject to a terminal disclaimer.

(21) Appl. No.: 11/906,484

(22) Filed: Oct. 1, 2007

(65) Prior Publication Data

US 2008/0047712 A1 Feb. 28, 2008

Related U.S. Application Data

(63) Continuation-in-part of application No. 11/092,422, filed on Mar. 29, 2005, now Pat. No. 7,296,627.

(51) Int. Cl.
*E21B 37/00* (2006.01)
*E21B 37/08* (2006.01)

(52) U.S. Cl. ............... 166/304; 166/312; 507/930; 507/931

(58) Field of Classification Search ............. 166/177.7, 166/191, 202, 222, 304, 307, 311, 312; 507/203, 507/259–262, 263, 277, 930, 931
See application file for complete search history.

(56) References Cited

U.S. PATENT DOCUMENTS

| | | | | |
|---|---|---|---|---|
| 2,358,665 | A | * 9/1944 | Shapiro | 510/188 |
| 3,279,541 | A | * 10/1966 | Knox et al. | 166/300 |
| 3,353,603 | A | * 11/1967 | Knight | 166/307 |
| 3,724,553 | A | * 4/1973 | Snavely et al. | 166/304 |
| 4,101,425 | A | * 7/1978 | Young et al. | 507/260 |
| 4,614,236 | A | * 9/1986 | Watkins et al. | 166/304 |
| 4,836,286 | A | * 6/1989 | Edwards | 166/304 |
| 5,008,026 | A | * 4/1991 | Gardner et al. | 507/235 |
| 5,152,907 | A | * 10/1992 | Dulaney et al. | 507/261 |
| 5,762,138 | A | * 6/1998 | Ford et al. | 166/279 |
| 6,242,388 | B1 | * 6/2001 | Sharma et al. | 507/90 |
| 6,593,279 | B2 | * 7/2003 | Von Krosigk et al. | 507/267 |
| 7,296,627 | B2 | * 11/2007 | Dyer | 166/304 |
| 2003/0111226 | A1 | * 6/2003 | Dyer | 166/312 |

* cited by examiner

*Primary Examiner*—George Suchfield
(74) *Attorney, Agent, or Firm*—James J. Mullen

(57) ABSTRACT

A method for cleaning oil wells to increase the flow of oil thereof by use of a unique aqueous cleaning emulsion comprising of water, hydrocarbon solvent, and detergent. This one step method provides for the simultaneously cleaning/removal of asphaltene and/or paraffin and scale. This method can be used alone or with the assistance of a wash tool which is a combination pressure and surge wash tool having a nipple assembly. A by-pass port is coupled to the nipple assembly and a diverter cup is coupled to the by-pass port. A plurality of pressure wash cups are positioned on the tool. A pressure wash port is located between the plurality of pressure wash cups and a pump shoe assembly is coupled to a bottom pressure wash cup.

14 Claims, 1 Drawing Sheet

METHOD FOR SIMULTANEOUS REMOVAL OF ASPHALTENE AND/OR PARAFFIN AND SCALE FROM PRODUCING OIL WELLS

RELATED PATENT APPLICATIONS

This patent application is a continuation in part of patent application Ser. No. 11/092,422, filed Mar. 29, 2005 now U.S. Pat. No. 7,296,627 and which is now allowed.

BACKGROUND OF THE INVENTION

1. Field of the Invention

This invention relates to oil and gas production wells and particularly to methods of simultaneously removing asphaltene and/or paraffin and scale from such wells.

2. Description of the Prior Art

Paraffin and/or asphaltene and scale formation in producing oil wells, and particularly those wells producing high-paraffin containing oils, significantly interferes with the effectiveness and efficiency of the well production. In severe cases, the presence of paraffin and/or asphaltene and scale, can, in essence, cause the oil production for a given well to cease.

Generally, the paraffin and/or asphaltene crystallizes out of and solidifies in the well bore, the area surrounding the well bore, the casing and tubing of the well thereby blocking further production.

In the past, attempts have been made to remove the paraffin and/or asphaltene by mechanically cutting it out of the well or using a so-called "hot-oiling" technique. The cutting procedure is a relatively crude procedure and requires extensive well shutdown time. Moreover, it is extremely inefficient inasmuch as substantial amounts of paraffin and/or asphaltene remain in the well. This remaining paraffin and/or asphaltene provides seed crystals which promote the rapid formation of additional paraffin and/or asphaltene. Consequently, paraffin and/or asphaltene builds up and the blocking situation quickly occurs again.

In the hot-oiling method, produced crude is heated to a temperature well above the melting point of the paraffin and/or asphaltene and is then circulated down through the annulus of the well and returned to a hot-oil heating truck via the production tubing. The purpose here is for the hot oil to melt and/or dissolve the paraffin so that it can be removed from the well in liquid form. This is an expensive method since the crude must be put through a heater treater along with a demulsifier in order to facilitate the removal of solids and water therefrom. In this method, the crude oil used is taken from the stock tank and has thus already made one pass through the treating facility and has already been demulsified. Another disadvantage to this method is that in many instances, 100% of the fluid injected is not recovered and thus some is lost to the reservoir.

During the hot-oiling process, a paraffin dispersant which is based on a petroleum sulfonate is added to the crude as it is being heated. The paraffin dispersant assists in dispersing the melted paraffin in the hot-oil phase.

Moreover, this technique is very dangerous, particularly with wells producing a crude having a low flash point. Indeed, such wells cannot be hot-oiled because the auto-ignition temperature of the oil is so low. Thus, bringing the oil in direct contact with a heating mechanism creates a substantial fire hazard.

Another procedure that has been tried is the so-called "hot acid" technique. In this process, an attempt is made to melt paraffin using a combination of hot water, heated xylene and hot acid. However, while this mixture may have some effect on the removal of carbonate scale build-up in wells, it has not presented a satisfactory answer to paraffin and/or asphaltene removal.

An additional disadvantage of each of the above methods is due to the fact that normally it is desirable to subject a well to acidization at some subsequent point in time after the paraffin and/or asphaltene removal. The mechanical cutting technique, hot-acid technique, and the hot-oil techniques leave the well bore, the area surrounding the well bore casing and tubing "oil wet". This is a disadvantageous situation for subsequent acidization. In the acidization technique, a mineral acid solution is introduced into the well to remove mineral deposits. The acid solution is aqueous and, if the interior portions and mechanical elements of the well are oil wet, direct contact of these surfaces with the acid solution is inhibited making the acidization treatment much less effective.

Such stimulation of oil and gas wells is a well known process and is described in U.S. Pat. No. 4,541,483.

Other more recent prior art attempts have been made trying to overcome the presence of the undesirable paraffin and/or asphaltene and scale in oil wells and associated equipment as stated below. In U.S. Pat. No. 3,930,539 there is disclosed a method for increasing the production in wells by the utilization of hydrochloric and phosphoric acid followed by ammonia to create a violent exothermic reaction at the bottom of the well and thus disintegrate the limestone and emulsify the paraffin thereby creating larger passages in the formation and which permits greater flow. This is not desirable since the reactions themselves create safety hazards and the paraffin still remains.

In U.S. Pat. No. 4,836,286, there is disclosed a method of removing flow-restricting matter such as paraffins from wells by use of a three stage process of introducing various solvent solutions into the bottom of the well over a period of time and then removing the solvents there from and passing an electrical charge there through followed by the reintroduction into the well. This has the disadvantage of numerous steps and the use of electrical charge.

In U.S. Pat. No. 6,593,279, there is disclosed the use of an acid based emulsion for cleaning oil sludges from well cuttings, well formations and down hole wells. These emulsions contain water, a surfactant mixture, an oil, a solvent, and an oxidizer. There is no disclosure of the removal of scale.

In U.S. Pat. No. 4,278,129, there is disclosed a two stage process of stimulating an oil well by the use of an oxyalkylated phosphate ester surfactant followed by the introduction of a hydrocarbon to drive the ester into the formation.

In U.S. Pat. No. 4,813,482, there is disclosed a method of removing paraffin from an oil well by treating the well with a heated solution containing a surfactant, a hydrocarbon solvent, and water in order to disperse the paraffin with the well into the solution.

In U.S. Pat. No. 5,909,774, there is disclosed a method of cleaning up a producing interval of a well bore drilled using a synthetic oil-water emulsion drill-in fluid. This method involves the use of three treatment fluids in three separate stages.

In U.S. Pat. No. 6,112,814, there is disclosed a method for cleaning a well bore plugged with deposits of heavy hydrocarbons and finely-divided inorganic solids by circulating a surfactant composition containing an alkyl polyglycoside, an ethoxylated alcohol, a caustic and an alkyl alcohol through the well bore with a coiled tubing.

The problems associated with the prior art set forth above are the use of numerous steps to remove paraffin, asphaltene, sludge, scale and/or other undesired materials from the wells and the fact that these multistep procedures are expensive and not efficient. These prior art problems are overcome by the unique one step method set forth below and the use of a novel aqueous cleaning emulsion which does not have to be heated to work over a wide range of temperatures.

SUMMARY OF THE INVENTION

The present invention provides a new process for the simultaneous removal of asphaltene and/or paraffin and scale from a well which is plugged with these types of materials. This novel process uses a unique aqueous cleaning emulsion comprising water, a detergent, a hydrocarbon solvent and an acid, such as a mineral acid, (all in certain selected amounts), to be contacted with the well bore and bottom of the well for a sufficient period of time to break down the asphaltenes and/or paraffins and scale. This is the sole step in this operation but it is within the scope here with to use a novel wash tool in combination there with to assist in this single procedure.

In accordance with one embodiment of the present invention, it is an object thereof to provide an improved method for removing foreign matter from a well to increase the output flow of the well.

It is another object of the present invention to provide an improved method in combination with a unique apparatus to clean the bore hole of the well to increase the output flow of the well.

It is still another object of the present invention to provide a one step process to simultaneously remove the asphaltene and/or paraffin and scale and thus clean the bore hole of the well to increase the output flow of the well that is less expensive and easier to use than prior art methods and devices.

BRIEF DESCRIPTION OF THE PREFERRED EMBODIMENTS

In accordance with one embodiment of the present invention, a method of cleaning oil well to increase oil flow is disclosed. The method comprises the single step of preparing an aqueous cleaning emulsion comprising water, a detergent, a hydrocarbon solvent, and a mineral acid, and then injecting said emulsion into the oil well.

In accordance with another embodiment of the present invention, the emulsion is injected into said oil well through the use of a combination surge and pressure wash tool. The combination pressure and surge wash tool has a nipple assembly, and a by-pass port is coupled to the nipple assembly. A diverter cup is coupled to the by-pass port. A plurality of pressure wash cups are positioned on the tool. A pressure wash port is located between the plurality of pressure wash cups. A pump shoe assembly is coupled to a bottom pressure wash cup. After the emulsion is injected into the well and is there for a short period of time, the surge and pressure wash tool is coupled to a tubing string of the oil well; the surge and pressure wash tool is then moved to the bottom of the oil well and then raised in repeat fashion.

The foregoing and other objects, features, and advantages of the invention will be apparent from the following, more particular, detailed description of the present invention and as illustrated in the accompanying drawings.

BRIEF DESCRIPTION OF THE DRAWINGS

The novel features believed characteristic of the invention are set forth in the appended claims. The invention in part, as well as a preferred mode of use, and advantages thereof, will best be understood by reference to the accompanying drawings, wherein like reference numerals and symbols represent like elements.

Figure 1:
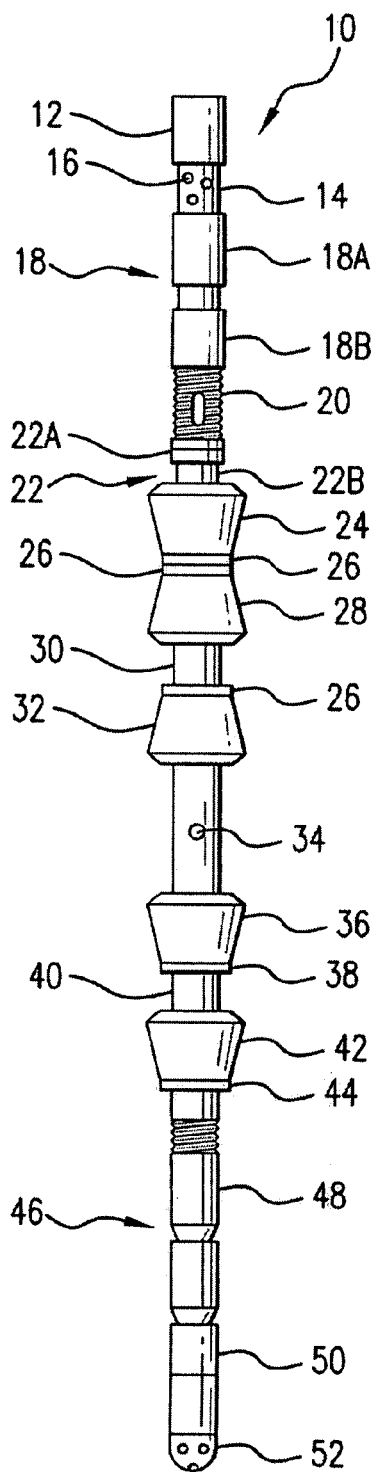
FIG. 1 is a simplified front view of the combination surge/pressure washer used in the present invention.

The novel aqueous cleaning emulsion of the present invention comprises (a) water; (b) a detergent; (c) a hydrocarbon solvent; and (d) an acid, such as a mineral acid, in portions as set forth herein.

The water constitutes from about 50% by weight to about 98%, preferably from about 85% to about 95%, by weight based upon the total weight of the emulsion. In one preferred embodiment of the present invention, the water is conditioned before mixing with the other constituents of the emulsion. Water generally available today is electron deficient and not in optimum states of equilibrium. This conditioning is conducted by passing the required amount of water through a device that causes water molecules to transform from a static state to an excited or active state, thus releasing energies that transform the bondings of the water molecules and any of their dissolved or suspended particles. In essence, this conditioning procedure provides electrons to the water solution in a catalytic manner to reduce the electron deficiencies. This dissociation and modulus rearrangement of particle charges creates a beneficial altered state to the water, and which has been found to be synergistic when used with the other materials of the cleaning emulsion in the directed environment.

These water conditions are commercially available and sold under trademarked names, CARE FREE water conditioner and EASY CARE water conditioner.

The detergent constitutes from abut 0.1% by weight to about 15% by weight based upon the total weight of the emulsion, and preferably from about 0.1% to about 5%. A wide range of detergents can be used in the cleaning emulsion, such as, for example, (1) World's CHAMPION brand of waterless hand cleaners (The Sealex Corporation, San Jose, Calif. 95111), and (2) Gent-L-Kleen Products Inc. (York, Pa. 17402-0409) such as GENT-L-KLEEN; GRIME GRABBER; ADVANTAGE HD; GLK CITRUS lotion; ZAPPER cleaner; POWER WIPES FORMULA 2; and GLK soap. In the use of a detergent in the emulsion formulation, it is preferred that such detergent contains a surfactant such as an anionic surfactant, a nonionic surfactant, a cationic surfactant, a zwitterionic surfactant, an ampholytic surfactant, and which can be an individual surfactant or a mixture of these surfactants. Examples of anionic and nonionic surfactants are set forth below. The other surfactants stated above are known in the art.

Anionic surfactants used in detergents comprise fatty acid soaps, alpha olefin sulfonate, sulfonates, amine ethoxylates, amine salts or linear alkyl benzene sulfonic acid, aromatic sulfonates comprising cumene, xylene and toluene sulfonate, earth metal salts of olefin sulfonate and alcohol sulfates and sulfonates, as well as blends of such anionic surfactants.

Nonionic surfactants suitable for use comprise ethoxylated nonionic surfactants selected from the group consisting of condensation products of ethylene oxide with aliphatic alcohols having from 8 to 22 carbon atoms in either straight or branched chain configuration as well as ethoxylated nonionic surfactants selected from the group consisting of condensation products of ethylene oxide with nonyl phenol, phenol, butyl phenol, di-nonyl phenol, octyl phenol or other phenols, as well as blends of such nonionic surfactants.

The acid constitutes from 0.1% by weight to about 15% by weight based upon the total weight of the emulsion, and preferably from about 0.1% to about 5%. Suitable acids include hydrochloric, phosphoric, sulfuric, hydrofluoric, nitric, citric, oxalic, maleic, acetic, fumaric, malic, glutaric, or glutamic acids, as well as mixtures of such acid. The preferred acid is hydrochloric acid.

The hydrocarbon solvent constitutes from about 0.1% by weight to about 20.0% by weight based upon the total weight of the emulsion, and preferably from about 0.1% to about 10%. The hydrocarbon solvents suitable for use in accordance with the present invention include kerosene, gasoline, diesel, jet fuel, zylene and mixtures thereof. The preferred solvent is kerosene. Other solvents which can be used in the present invention include turpene, methanol, benzene, hexane, trichloroethane, acetone, isopropyl methanol, xylol, butanol, and isoproponal.

Figure 2:
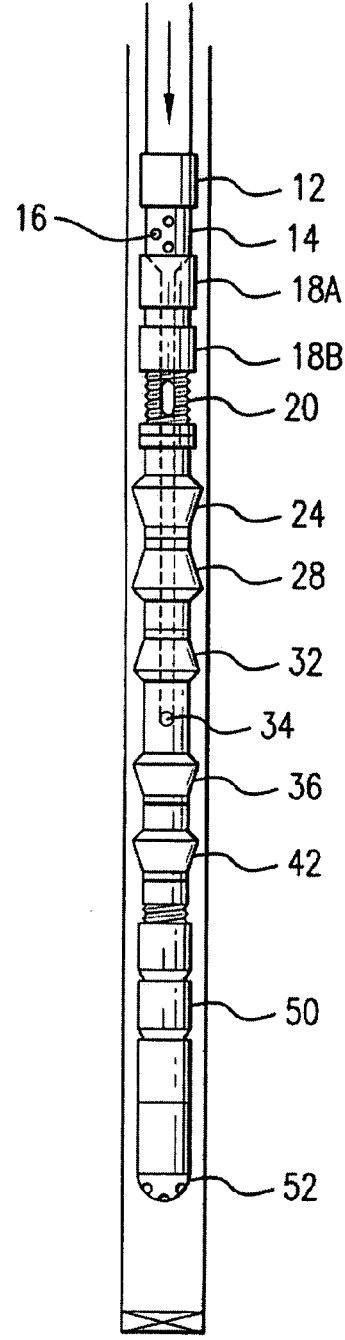
FIG. 2 is a simplified front view of the combination surge/pressure washer used in the present invention in a downward movement on a tubing string of an oil well.
Figure 3:
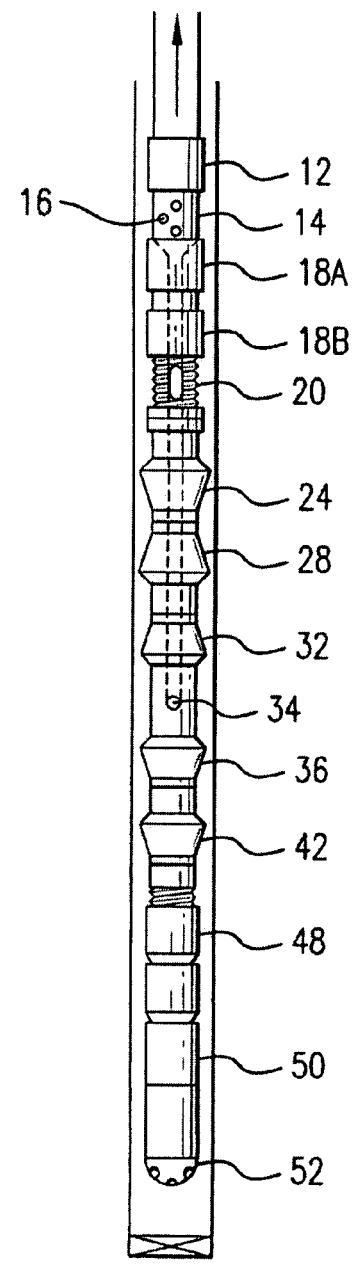
FIG. 3 is a simplified front view of the combination surge/pressure washer used in the present invention in an upward movement on a tubing string of an oil well.

In general, the well bore can be cleaned with the novel emulsion set forth herein. In another facet of the present invention, the one step cleaning process can be carried out by use of a wash tool as described below and shown in FIGS. 1-3. The prior art discloses several wash tools as exemplified in U.S. Pat. No. 1,916,875; U.S. Pat. No. 2,055,515; U.S. Pat. No. 2,290,441; U.S. Pat. No. 2,512,801; U.S. Pat. No. 2,842,211; U.S. Pat. No. 3,760,878; U.S. Pat. No. 3,833,060; U.S. Pat. No. 3,861,465; U.S. Pat. No. 4,027,732; U.S. Pat. No. 4,393,930; U.S. Pat. No. 4,431,058; U.S. Pat. No. 4,505,341; U.S. Pat. No. 4,921,046; U.S. Pat. No. 4,899,821; U.S. Pat. No. 4,991,653; and publication U.S. 2003/0111226 A1.

The surge/pressure wash tool of the present invention has been found to be quite efficient for the cleaning procedure when used in conjunction with the aqueous cleaning emulsion. This tool is more fully described below.

Referring now to FIG. 1, a combination surge/pressure wash tool 10 (hereinafter tool 10) is shown. The tool 10 is used in conjunction with the novel aqueous cleaning emulsion in the oil industry to assist in cleaning and purging undesirable foreign matter which will partially/fully block the production tube or drill string of the finished well. The tool 10 and method of using the tool 10 with said emulsion will assist in cleaning any obstructions (e.g. asphaltene, paraffin and scale) in the well thereby increasing the production from the well.

The tool 10 is designed to work in both shallow and deep wells as well as low or high fluid level wells. The tool 10 is further designed to handle the different pressures encountered during surge and pressure washing workovers. The tool 10 can be easily modified to convert from a pressure wash tool to a surge wash tool as disclosed herein.

The tool 10 is comprised of a combination of parts to form a tubular shaped device. The tool 10 has a hollow interior in order to allow the emulsion to flow through tool 10. The tool 10 has a collar 12 located on the top section of the tool 10. The collar 12 is generally circular in shape and will have a central opening there through. The collar 12 is used to attach tool 10 to the tubing string of the well. The collar 12 is coupled to a perforated nipple assembly 14. The perforated nipple assembly 14 is conical in shape. The perforated nipple assembly 14 will have a tubular top section which narrows down in width similar to a funnel. A plurality of annuli 16 are located around the outer top perimeter of the tubular top section of the perforated nipple assembly 14. The annuli 16 allows the emulsions to enter and flow through tool 10 when tool 10 is configured as a surge wash tool.

A connector assembly 18 is used to couple the non-perforated nipple assembly, not shown. The connector assembly 18 is used to couple the perforated nipple assembly 14 to a by-pass port 20. The connector assembly 18 may be formed of a variety of components. In the embodiment depicted in the Figures, the connector assembly 18 comprises of a male and female connector 18A which is coupled to the tubular top section of the perforated nipple assembly 14. A collar 18B is then coupled to the male and female connector 18A and the by-pass port 20.

The by-pass port 20 is coupled to the collar 18B. The by-pass port 20 extends down to the bottom of tool 10. The by-pass port 20 will transport said emulsion with tool 10. The by-pass port will further allow said emulsion to enter the tool 10 during certain operating conditions described herein.

A spacing device 22 is coupled to a top section of the by-pass port 20. In the embodiment depicted in the Figures, the spacing device 22 is a combination nut 22A and a spacer 22B. Coupled to the spacing device 22 is a diverter wash cup 24. The diverter wash cup 24 is conical in shape; the diameter of the bottom section is slightly smaller than the diameter of the top section. The diverter wash cup 24 is used to divert the emulsion with sand from the by-pass port 20 and out of the bottom of tool 10.

Coupled to the bottom of the diverter wash cup 24 is a pair of holding devices 26. The first holding device 26 is used to hold the diverter wash cup 24 in position. The second holding device 26 is coupled directly below the first holding device 26. The second holding device 26 is used to hold a wash cup 28. The wash cup 28 is also conical in shape; the diameter of the bottom section is slightly larger than the diameter of the top section. The wash cup 28 is used to create a suction in the well which helps to draw and purge out the emulsion within tool 10.

A spacer 30 is coupled below the first wash cup 28. A holding device 26 is coupled below the spacer 30. The holding device 26 is used to secure a second wash cup 32. The second wash cup 32 is similar to the first wash cup 28. The second wash cup 32 is conical in shape; the diameter of the bottom section is slightly larger than the diameter of the top section. The wash cup 32 is used to create a suction in the well; thus drawing in and purging out the emulsion within tool 10.

Located below the second wash cup 32 is a pressure wash port 34. The pressure wash port 34 allows the emulsion to exit tool 10. In operation, the movement of tool 10 will cause the emulsion to exit the pressure wash port 34 at an elevated pressure. The pressurized fluid will clean debris which is hindering the flow of oil out of the well. Thus, pressure wash port 34 allows tool 10 to assist the emulsion in the cleaning and opening the clogged perforations and openings of the wells.

The tool 10 will further have a third wash cup 36 located below the pressure wash port 34. The third wash cup 36 is similar to wash cups 28 and 32. The wash cup 36 is conical in shape; the diameter of the bottom section is slightly smaller than the diameter of the top section. The wash cup 36 is used to help draw in and purge out the emulsion within tool 10. A holding device 38 is couple to a bottom section of third wash cup 36. The holding device 38 is used to hold the third wash cup 36 in position on tool 10.

A fourth wash cup 42 is coupled below the third wash cup 36. A spacer 40 may be positioned between the third wash cup 36 and the fourth wash cup 42. The fourth wash cup 42 is also conical in shape; the diameter of the bottom section is slightly smaller than the diameter of the top section. The wash cup 42 is also used to help draw in and purge out the emulsion within tool 10. A holding device 44 is used to secure the fourth wash cup 42 in position on tool 10.

A pump shoe assembly 46 is coupled below fourth wash cup 42. The pump shoe assembly 46 helps to control the intake and the dispersal of the emulsion in tool 10. The pump shoe assembly 46 has a connector 48 positioned below fourth wash cup 42. In the embodiment depicted in the Figures, the connector 48 is a male/female connector. A pump shoe valve 50 is coupled to the connector 48. The pump shoe valve 50 has a swing flap internal, not shown, to the pump shoe valve 50. The movement of tool 10 will control the movement of the swing flap. A ported blow plug 52 is coupled to the bottom of the pump shoe valve 50.

The tool 10 can be used in both deep and shallow wells and in low and high fluid wells. The tool 10 is easily converted from a surge wash tool to a pressure wash tool by removing the perforated nipple assembly 14 and replacing it with a non-ported (no perforations) nipple assembly. The by-pass port 20 is covered with a spacer between locking nuts. The pump shoe valve 50 on the bottom of the tool 10 is also removed. The ported blow plug 52 is replaced with a non-ported blow plug. The change from a surge wash tool to a pressure wash tool will reduce the washing distance, for example, from 45 to 70 feet down to 2 feet of the distance between the two wash cups on either side of the pressure wash port 34. The pressure wash tool is used in deeper and high pressure wells. The pressure wash tool also requires a high pressure pump that pumps the emulsion down the tubing string and out the pressure wash port 34.

Wash Tool Operation

Referring to the Figures wherein like numerals and symbols represent like elements, the operation of tool 10 is as follows. The tool 10 is designed to be coupled to the tubing string of an oil well. The tubing string is held by the oil rig's elevator which is attached to the oil rig's blocks and travels the height of the oil rig's derrick. The up and down (vertical) movement in the well causes tool 10 to assist the emulsion in cleaning debris (asphaltene, paraffin and scale) in the bore hole. Pressure is applied to well perforations on the downward movement of tool 10 and suction is applied to the well perforations on the upward movement of tool 10.

As stated above, tool 10 runs on the tubing string of the well so that the washing action of the tool 10 is the distance that the rig's blocks travel up and down the derrick length, approximately 45 to 70 feet per run.

In order to treat a well, the emulsion is added to the well prior to using the wash tool. In accordance with on embodiment of the present invention, the emulsion is added at least several hours (e.g. 10 to about 100 hours) prior to using tool 10. This will allow a sufficient amount of time for the emulsion to circulate within the well and breakdown the asphaltenes, paraffins and scale build-up/debris. The novel emulsion is as described herein.

The tool 10 is coupled to the tubing string. On the downward motion of the tubing string, tool 10 will enter and move down the bore hole of the oil well. The tubing string and tool 10 are free floating until tool 10 passes the bottom perforation. Then the blocks are moved up the oil derrick, thus moving the tubing string with tool 10 up the bore hole.

The emulsion is injected into tool 10 through the use of a high pressure pump which injects the fluid into the plurality of annuli 16 which are located around the outer top perimeter of the tubular top section of the perforated nipple assembly 14.

As tool 10 is lowered, the swing flap internal to the pump shoe valve 50 is in a closed position. The emulsion in the well, that is located below the bottom wash cup 42, will be forced to enter the tool 10 through the ported blow plug 52. The emulsion in the well will pass through a hole in the swing flap and exit at the by-pass port 20. The emulsion in the well, as it travels through tool 10, will mix with emulsion being injected into tool 10. This combined emulsion will then be used to clean the well. The emulsion injected into tool 10 will also exit the tool 10 at the pressure wash port 34, further cleaning the well.

On the upward movement of tool 10, a suction is created below each of the wash cups. This draws emulsion and sand into the well bore. The by-pass port 20 allows the emulsion to enter during the upward movement of tool 10. The emulsion and any debris/sand are sent through tool 10 and out the ported blow plug 52. The swing flap is now in the open position thus allowing the emulsion and the debris/sand to exit and be deposited at the bottom of the well.

The novel emulsion thus functions in one part of the present invention as a "pre-treatment stimulation service fluid" allowing for the designed solvents to be water soluble and acid (e.g. hydrochloric acid) to be oil soluble for the cleaning of well bore perforations during well circulation. This fluid stimulation design can be used alone or it can also be made to work in combination with the mechanical devices of set design for this operation as described herein.

The surge/pressure wash tool can be used in both shallow and deep oil wells by making a few changes in the wash tool configuration. These changes can then handle the different pressures encountered during surge/pressure or pressure washing operations. This one wash tool can take the place of two (2) wash tools of the prior art.

The hydro self-rotating pressure wash tool with built-in filter system is run on the rig's tubing string and can be used in both shallow and deep oil wells. This wash tool can also be used in damaged wells that have restricted entry. The pressure to the self-rotating nozzles and jets is controlled from the surface.

In one part of the present invention, the chemical and mechanical treatment on marginal oil wells opens up plugged perforations so that increased fluid can flow into the well bore allowing more oil production from the wells.

The chemical phase is the novel aqueous cleaning emulsion, "the designed work over fluid", that is oil, water, solvent and acid soluble, and stable simultaneously. This "work over fluid" combination allows acid to penetrate the oil barrier and dissolve scale while at the same time blend with the oil to break down the bonds of paraffin, bitumen and ashphaltines. In essence, it makes the entire emulsion/fluid in the well bore a cleaning agent. The emulsion/work over stimulation fluid is circulated around the well bore through the annuli up the tubing string and back down the annuli by utilizing the well's pumping unit for a period of time, e.g. 72 hours. After chemically cleaning the well, the well can be turned back to production, with no harm to the operating facilities or the well can be pulled by a rig, and a surge/pressure wash or high pressure wash job done on the well to further clean the perforations if needed.

The surge/pressure wash tool is run on the tubing string so that the washing action of the wash tool is the distance that the rig's blocks travel up and down the derrick length. The surge wash tool can be used in both low and high fluid level wells with the use of a "ported nipple" in high fluid wells and a "knockout assembly" in place of the ported nipple in low fluid wells. The surge/pressure wash tool is converted to a pressure wash tool from a surge wash tool by removing the ported nipple and replacing it with a non-ported nipple. Then the diverter port is covered with a spacer between 2 locking nuts, and removing the pump shoe valve on the bottom of the tool. The last step is to replace the ported blow plug with a non-ported blow plug, not shown. The change from a surge wash tool to a pressure wash tool will reduce the washing distance from e.g. 45 to 75 feet down to 2 feet or the distance between the two center cups on either side of the pressure port. The pressure wash tool is used in deeper and high pressure wells. The pressure wash tool also requires a high pressure pump that pumps the treated fluid down the tubing string and out the pressure port in the wash tool.

The hydro self-rotating down hole stimulation wash tool is designed to adapt the self-rotating nozzle that is used in the oil industry today on coil tubing that requires a separate piece of work over equipment and is not the equipment that pulls the down hole pump, rods and tubing from the well and services the well. This adaptation allows the self-rotating wash tool to be run on the tubing string of the work over service rig that pulls the well without the need of other outside support equipment.

With reference to the above described matter, the present invention covers a single step process for cleaning oil wells with the novel emulsion and/or combination chemical/emulsion and mechanical cleaning process for oil wells. The chemical application in this latter case acts as a pre-treatment that converts the well bore fluid into a cleaning agent. The base chemical allows solvents to become water soluble. The solution acts in the well bore to break down paraffin, asphaltene and bitumen bonds that are plugging the entry of emulsion/fluid into the well bore from the formation. The well is placed into circulation by using its own pumping unit for a period of e.g. 72 hours.

Well perforations can also be plugged by a combination of layers of scale, paraffin and asphaltenes. In these plugging cases, the mineral acid (HCL) is mixed with the cleaning agent along with the solvents. The mineral acid (HCL) becomes oil soluble and will react with the scale, while the solvents concurrently react with the paraffins asphaltenes and bitumens. This reaction breaks down the bonds that hold the combination scale mixture to the casing wall and plugs the perforations. The reaction of the mineral acid with the scale (e.g. calcium carbonate) will create $CO_2$ gas that is released in the well bore; this $CO_2$ gas will aid in the cleaning action and help break the bonds of the material plugging the wells perforations. At the end of (e.g. 72 hour) circulating period, the well can be returned to production or the well can be further cleaned by mechanical means using the emulsion already in the well.

When chemical treatment is followed by mechanical cleaning, the pre-treatment fluid/emulsion is left in the well bore. The well now can be cleaned with either a surge/pressure wash tool or a hydro self-rotating stimulation wash tool.

The surge/pressure wash tool is run on the work over rigs tubing string. The up and down movement of the tubing string in the well bore allows the wash tool to assist in cleaning the perforations. The surge/pressure wash tool cleans the well bore and perforations both in the downward movement with the weight of the tubing string and the upward movement with suction. The well bore perforations are cleaned while the rig's blocks travel the height of the rigs derrick. The emulsion/pre-treatment fluid cleaning agent is left in the well bore while the surge/pressure washing is being done; if more emulsion/treatment fluid is needed, it can be added down the annuli during the well cleaning.

The self-rotating pressure wash tool is designed to be run on the work over rig's tubing string. At the surface, high pressure emulsion/stimulation fluid is pumped down the tubing string; this activates the self-rotating nozzle head at the bottom of the tubing string and allows the high pressure jetted emulsion/fluid to clean the well perforations. The tubing string is raised up and down in the well bore while pumping the emulsion/stimulation fluid. The tubing string that holds the wash tool is held in place by the rig's elevators which are attached to the rig's blocks and travel the height of the rig's derrick. High pressure emulsion/stimulation fluid is pumped at the surface through the tubing string to the wash tool on the bottom from a high pressure pump truck that has its own emulsion/fluid supply tank. The emulsion/stimulation fluid passes through a series of filters located above the wash tool and at the top of the wash tool. The in-line filters keep the jets free of foreign materials during washing operations. High pressure emulsion/fluid exits the nozzles through the jets in two (2) directions to clean the perforations and casing well bore.

The advantages of the present invention are as follows:

The oil well pre-treatment fluid is:
1. Economical and environmentally safe
2. Allows solvents to be water soluble
3. Allows mineral acid to be oil soluble
4. Cleaning solution/emulsion is oil, water, solvent and acid soluble simultaneously
5. Stable under high to low temperature ranges, e.g. 35 F to about 120 F
6. Compatible with production facilities The surge/pressure wash tool is:
1. Wash tool design can be used for both surge and pressure washing
2. Surge washing is limited to a depth of 2,000 feet or 15,000 lbs.
3. Pressure wash tool has greater depth range
4. Surge wash tool can be used on both low and high fluid level wells
5. By-pass port and fifth wash cup (diverter cup) are used to move sand through the wash tool to the bottom of the well
6. Pump shoe swing valve with hole in flap is used to relieve pressure during the downward movement of the wash tool The hydro self-rotating pressure wash tool is:
1. Run on the tubing string so that the washing action of the tool is the distance that the rig's blocks travel up and down the derrick height, e.g. 45 feet on a single rig and 75 feet on a double rig.
2. Used in both low and high fluid level wells, high and low pressure wells and wells with wide temperature ranges
3. The wash tool nozzle is self-rotating by the applied pressure from the surface down tubing string with a maximum operating pressure of about 10,000 psi
4. The adapted holder for the self-rotating nozzle has its own filter system to keep the jets from plugging
5. No outside equipment is needed other then the service rig that pulls the well and the rigs high pressure pump truck with tank
6. The filter system is interchangeable for use with different types of emulsion/fluid and fits in the bottom stand of tubing above the wash tool.
7. The holder of the self-rotating wash tool can be interchanged to adapt to different size self-rotating nozzle heads from ¾" to 1½" and emulsion/fluid pumping capacities from about 60 gpm to about 100 gpm Prior to the present invention, there was no chemical pre-treatment stimulation work over fluid that was simultaneously oil, water, solvent, and acid soluble, nor was it stable under all kinds of operating conditions, and is environmentally and facility safe. This chemical treatment can stand alone or work in combination with the surge/pressure wash tool or the hydro self-rotating pressure wash tool. There is no mechanical device on the market used in the oil industry that will reduce well perforation cleaning by half (½) the time and have the cleaning job performance last from 1 to 2 years. Using the chemical alone or chemical and mechanical cleaning process will open the well's entry to the formation and free the area between the well bore and the formation of scale, paraffin, asphaltene and bitumen.

EXAMPLES

Example 1

Preparation of the Aqueous Cleaning Emulsion

Seven pounds of conditioned water (prepared by passing through a CARE FREE water conditioner) are added to seven pounds of detergent (CHAMPION'S WATERLESS hand cleaner) and mixed together. This mixture was then mixed together with 40 pounds of kerosene and the resultant materials were blended together for a period of 10 minutes. Another 40 pounds of kerosene was added to the above mixture and again blended for an additional 10 minutes. At the end of this time, additional kerosene was added until the liquid forms an emulsion. This emulsion was blended for an additional 5 minutes. The emulsion was saturated with kerosene, was water soluble and had the thickness of a milk shake.

Into a 225 gallon tank, there was added 8 gallons of said emulsion and then 100 gallons of catalytic conditioned water was introduced by the use of a nozzle attached to the end of the conditioned water hose. The fluid in the tank was further mixed by circulating it from the bottom to the top of the tank by a pump for a period of 10 minutes. Just prior to the use of this fluid, 5 gallons of a 32% by weight solution of hydrochloric acid is added and mixed to the fluid/emulsion. This emulsion was stable and water/oil soluble.

Example 2

Treating Oil Wells with the Emulsion

Using the procedure set forth in Example 1, six batches of emulsion were prepared and used to treat six individual partially/fully plugged oil wells in the Midway Sunset Field near Taft, Calif.

In each case, the emulsion from the 225 gallon tank was pumped into the well bore through the annuli thereof. After the emulsion was emptied from the tank, 40 gallons of conditioned water was pumped into the well. The emulsion in the well bore was allowed to circulate for 72 hours and then high pressure steam was used to displace said emulsion from the well bore into the surrounding geological formations. Each well was placed back in operation/production. The average production increase was 34 barrels per day/6 wells or an average of 5.67 barrel increase/day/well.

Example 3

Treating Oil Wells with the Emulsion in Combination with Surge/Pressure Wash Tool Following the procedures set forth in Examples 1 and 2, the well was not returned to production, and the emulsion remained in the well. The surge/pressure wash tool was placed at the end of the tubing string and run into the well. Then an additional 100 barrels of emulsion fluid was allowed to gravity flow into the well through the annulus valve in the well head. The emulsion followed the wash tool down the well. When the wash tool reached the slotted liner or the perforated zone, the wash tool began to float indicating the well was still plugged. After a short time the wash tool reached the bottom of the well. Then it was moved up and down the length of the derrick (45 feet) thus promoting a suction in the upward movement of the wash tool, below the wash tool. The tubing string and wash tool on its own weight returns to the bottom of the well. The emulsion entered the tubing string and wash tool through the perforated nipple above the wash tool. The up and down movement was repeated for about 10 times until there was not more resistance to the wash tool across this area. One joint/stand of tubing was removed from the tube string at the surface and the procedure above repeated for 10 times until all the perforated intervals were washed. The emulsion was then pressured into the formations of the well and the well was placed back in operation the next day after checking for any solids settlement. The increase in production of this well was 8 barrels per day.

Example 4

Treating Oil Wells with the Emulsion in Combination with the Pressure/Surge Wash Tool Following the procedures set forth in Examples 1 and 2, the well was not returned to production and the emulsion remained in the well. The pressure/surge wash tool (no perforated nipple above the tool) was placed on the end of the tubing string. The tubing string was then placed in the hole and was run to the bottom of the well. When it reached the bottom, a pump at the surface was engaged and 50 barrels of conditioned water containing 5 gallons of emulsion was pumped under pressure down the tubing string and out of the port in the tool between the cups. The pressure in the pump dropped as the water/emulsion was displaced into the formation and then the tubing string was slowly moved up the hole. This process was repeated until the water/emulsion had been displaced into the formation. The pressure in the well was bled off at the surface from the pump's by-pass to a holding tank. Then one joint/stand was removed from the tubing string and the high pressure hose was reattached to the tubing string and the procedure was repeated up the hole until all perforations were treated and all the water/emulsion had been displaced. The wash tool on the tubing string was then removed from the well, and the well was shut-in over night in order to allow fill or solids to settle to the bottom. The next day, the fill is removed from the bottom of the well and returned to production. The increase in production of this well was 9 barrels per day.

Example 5

Treating Oil Wells with the Emulsion in Combination with the Hydro Self-Rotating High Pressure Wash Tool Following the procedures set forth in Examples 1 and 2, the well was not returned to production, and the emulsion remained in the well. After checking the well for fill, the Hydro-tool was placed on the tubing string and run down the hole to a point just above the fluid level in the well. A high pressure pump was engaged at the surface and additional emulsion was pumped into the well until the pressure reached 1000 psi. The pump was disengaged and 3 joints of tubing were added to the tubing string until the Hydro-tool was 10 feet off the bottom of the well. A high pressure hose was then connected to the tubing string and then the emulsion treated fluid was displaced out of the Hydro-tool. The surface pressure was increased to 1500 psi and the Hydro-tool was moved up the hole very slowly. This up and down procedure was repeated 10 times, at which time the perforations were washed and the emulsion was displaced. The next day the well was returned to production after checking for fill. The increase in productivity of this well was 7 barrels per day.

In another aspect of the present invention, it has been found that the pH of the well is determinative of whether or not there is a need for the acid to be included in the cleaning fluid. It has been found the if the pH of the well is about 7.2 or less than 7.2, then there is no requirement for the acid to be used as the results (without acid) will be essentially the same if the acid component is used. The following example demonstrates this unique facet of another aspect of the present invention.

Examples 6 and 7

Preparation of the Aqueous Cleaning Fluid

Seven pounds of conditioned water (prepared by passing through a CARE FREE water conditioner) are added to seven pounds of detergent (CHAMPION'S WATERLESS hand cleaner) and mixed together. This mixture was then mixed together with 40 pounds of kerosene and the resultant materials were blended together for a period of 10 minutes. Another 40 pounds of kerosene was added to the above mixture and again blended for an additional 10 minutes. At the end of this time, additional kerosene was added until the liquid forms an emulsion. This emulsion was blended for an additional 5 minutes. The emulsion was saturated with kerosene, was water soluble and had the thickness of a milk shake.

Into a 225 gallon tank, there was added 8 gallons of said emulsion and then 100 gallons of catalytic conditioned water was introduced by the use of a nozzle attached to the end of the conditioned water hose. The fluid in the tank was further mixed by circulating it from the bottom to the top of the tank by a pump for a period of 10 minutes. In example 6, no acid was utilized. In example 7, another batch of cleaning fluid was prepared as described above and just prior to the use of this example 7 fluid, 5 gallons of a 31% by weight solution of hydrochloric acid was added and mixed to the fluid/emulsion. This example 7 fluid/emulsion was stable and water/oil soluble.

Examples 8 and 9

Treating Oil Wells with the Examples 6 and 7 Fluid/Emulsions

Using the procedure set forth in Examples 6 and 7, 27 batches of Example 6 (no acid) and 3 batches of Example 7 (with acid) fluid/emulsions were respectively prepared and used to treat thirty individual partially/fully plugged oil wells in the Midway Sunset Field near Taft, Calif. The pH of each of the thirty wells was determined prior the treatment, and the average pH was 7.1.

In each case, the emulsion from the 225 gallon tank was pumped into the well bore through the annuli thereof. After the emulsion was emptied from the tank, 40 gallons of conditioned water was pumped into the well. The emulsion in the well bore was allowed to circulate for 72 hours and then high pressure steam was used to displace said emulsion from the well bore into the surrounding geological formulations. Each well was placed back in operation/production. The average oil production increase was an average of 1.48 barrel increase/day/well for the Example 6 (no acid used) fluid used and 1.31 barrel increase/day/well increase for the Example 7 (with acid) fluid used. Thus, it can be appreciated that the pH of the well is a significant factor in the treatment of oil wells.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A one step process for removing both asphaltenes and/or paraffins and scale simultaneously from an oil well containing clogged perforations or openings comprising the steps of:
    a. preparing an aqueous cleaning emulsion consisting essentially of:
        i) from about 50% a to about 98% by weight, water;
        ii) from about 0.1% to about 15% by weight, detergent; and
        iii) from about 0.1% to about 20.0% by weight, hydrocarbon solvent; with the proviso that said emulsion is in a stable state over a wide range of temperatures and that the three materials, (i)-(iii) are in solution;
    b. contacting said emulsion with the interior of the oil well for a period of time sufficient to dispense asphaltenes, paraffins and scale within the well from said openings.

2. The process as set forth in claim 1, wherein the water is conditioned water.

3. The process as set forth in claim 1 wherein the detergent contains a material selected from the group consisting of zwitterionic, ampholytic, nonionic, anionic and cationic surfactants and mixtures thereof.

4. The process as set forth in claim 1 wherein the hydrocarbon solvent is selected from the group consisting of gasoline, diesel, jet fuel, kerosene, zylene, mineral spirits and mixtures thereof.

5. The process as set forth in claim 1 wherein (a) the water is conditioned; (b) the detergent contains a surfactant; and (c) the hydrocarbon solvent is kerosene.

6. The process as set forth in claim 1 wherein the oil well has a pH of less than about 7.2.

7. A method of cleaning an oil well containing asphaltene and/or paraffin and scale to increase oil flow therefrom comprising the steps of:
    a. adding an aqueous cleaning emulsion consisting essentially of water, a detergent, and a hydrocarbon solvent into the oil well containing a tubing string;
    b. coupling a surge and pressure wash tool to said tubing string of the oil well;
    c. moving the surge and pressure tool to the bottom of said oil well; and
    d. raising the surge and pressure wash tool after a reasonable period of time, thereby providing a period of contact under pressure and vacuum of said emulsion with said asphaltene, paraffin and scale.

8. The method of claim 7 further comprising the step of injecting additional quantities of emulsion into the surge and pressure wash tool after the completion of step d.

9. The method of claim 7 further comprising the steps of:
    a). moving the surge and pressure tool to the bottom of said oil well after raising the surge and pressure wash tool; and
    b) raising the surge and pressure wash tool after a reasonable period of time.

10. The method of claim 7 wherein in step b, replacing the surge and pressure wash tool with a hydro self-rotating high pressure wash tool which is then moved up and down the oil well as set forth in steps c and d.

11. The method of claim 7 wherein the surge and pressure wash tool comprises:
  a) a nipple assembly
  b) a by-pass port coupled to the nipple assembly wherein the port by-pass port allows the emulsion to enter the tool on an upward movement of the tool;
  c) a diverter cup coupled to the by-pass port wherein the diverter cup diverts the emulsion with debris down the tool and out a bottom section of the tool;
  d) a plurality of pressure wash cups positioned on the tool for creating a suction below each of the plurality of cups;
  e) a pressure wash port located between the plurality of pressure wash cups wherein the pressure wash port allows the emulsion to exit the tool at an elevated pressure to clean the wells; and
  f) a pump shoe assembly coupled to a bottom pressure wash cup.

12. The method of claim 11 wherein the nipple assembly is a perforated nipple assembly having a plurality of annuli located around an outer top perimeter.

13. The method of claim 11 wherein the nipple assembly is a non-port nipple assembly.

14. The method of claim 11 wherein the pump shoe assembly comprises:
  a. a connector coupled to a bottom section of the tool;
  b. a pump shoe valve coupled to the connector; and
  c. a blow plug coupled to the pump shoe valve.

\* \* \* \* \*